Patented Sept. 1, 1953

2,650,894

UNITED STATES PATENT OFFICE 2,650,894

RIBOFLAVIN-MONOBORATE AND PROCESS FOR PREPARATION THEREOF

Richard De Mott Fine III, Merchantville, N. J., assignor to McNeil Laboratories, Incorporated, Philadelphia, Pa., a corporation of Pennsylvania No Drawing. Application June 16, 1948,
Serial No. 33,444

17 Claims. (Cl. 167—81)

The present invention relates to novel riboflavin products having therapeutic and other advantageous properties, and more particularly, the invention relates to novel riboflavin compounds which may be administered in solid form or may be dissolved in aqueous or other media to form, if desired, therapeutic solutions containing riboflavin to the extent of many times the adult minimum daily requirement in each cubic centimeter. The invention, therefore, also relates to these relatively highly concentrated riboflavin-containing solutions, useful for injection and other purposes.

Riboflavin is one of the vitamins of the vitamin B complex and is known as vitamin $B_2$. Chemically, riboflavin is 6,7-dimethyl-9-(1'-d-ribityl) isoalloxazine and corresponds to the empirical formula $C_{17}H_{20}O_6N_4$. Riboflavin is only very slightly soluble in water, the solubility having been reported as about .012% at room temperature and as a result, its use in parenteral solutions either alone or with other vitamins, has presented a problem. However, because of the value of riboflavin in preventing and relieving the symptoms caused by a deficiency of this vitamin, such as, for example, glossitis, cheilosis, keratitis, and corneal infiltration as well as its value as an adjunct to other B vitamins in multiple deficiency states, such as pellagra, means for rendering riboflavin in a sufficiency soluble and stable form to be practical for injection purposes have been sought.

Various attempts have been made to solubilize riboflavin, and while these procedures have increased somewhat the solubility of riboflavin in water, they were attended by certain disadvantages. For example, it has been found that the extended heating required in certain processes is undesirable since riboflavin tends to undergo irreversible changes when heated, especially in alkaline solution. On the other hand, in those procedures which do not rely on extended heating for stabilization, the riboflavin or complex formed thereof to a great extent has precipitated out upon cooling and allowing the solution to stand. Furthermore, large non-therapeutic excesses of solubilizing agents such as boron compounds, which have been relied upon in the past to dissolve the desired amount of riboflavin, are undesirable and interfere with the satisfactory isolation of the product.

Therefore, one of the primary objects of the present invention is to provide novel riboflavin-containing compounds which will possess therapeutic properties and may be administered in solid form or in aqueous solutions, to supply riboflavin to the human system.

A further object of the present invention is to provide simple riboflavin-containing compounds which are relatively stable, and which may be used to prepare aqueous solutions containing many times the adult minimum daily requirement of riboflavin per cubic centimeter of solution.

Another object is to provide riboflavin-containing compounds which exhibit marked solubility and improved stability in aqueous media, and hence may be used alone or in combination with other vitamins in preparing solutions having therapeutic uses.

A further object of the invention is to provide relatively concentrated solutions of riboflavin-containing compounds in both acid and alkaline aqueous media.

Further objects will be apparent from a consideration of this specification and the claims.

The novel compounds of the present invention, having therapeutic value and possessing the advantageous properties herein set forth, are the alkali metal salts of riboflavin monoborate, i. e. a compound in which the boron atom of $MBO_2$ is attached to the ribityl group of the riboflavin, by reaction involving the hydroxyl group attached to the 4' carbon atom and the hydroxyl group attached to an adjacent carbon atom. Molecular weight and other determinations have established that the compounds contain one gram atom of alkali metal and one gram mol of $BO_2$ per gram mol of riboflavin. The empirical formula for the compound is $C_{17}H_{20}O_8N_4BM$, wherein M is an alkali metal selected from the group consisting of sodium, potassium, and lithium. While the sodium salt is the preferred compound, it has been found that for the purposes of this invention, potassium or lithium salts may be used if desired.

Alkali metal salts of riboflavin monoborate may be isolated in solid form from substantially neutral and alkaline aqueous solutions. Thus, in aqueous solutions having a pH above 7.5, the alkali metal salt is stable; whereas in aqueous solutions in the range approaching neutrality, that is a pH between about 7.5 and about 6.5, the alkali metal salt is less stable and a portion thereof appears to be converted into riboflavin monoborate or riboflavin. In aqueous solutions having a pH lower than the neutral range, the alkali metal salt of riboflavin monoborate is even less stable or soluble. Thus, as will be pointed out hereinafter, niacinamide is employed to stabilize or solubilize the alkali metal salt in substantially neutral or acid aqueous media. In this specification and claims, the term "neutral range" is used to refer to the pH range between about 6.5 and about 7.5; the term "substantially neutral aqueous solution" is used to refer to solutions having a pH between about 6.5 and about 7.5; the term "alkaline aqueous solution" is used to refer to solutions having a pH above about 7.5; and the term "acid aqueous solution" is used to refer to solutions having a pH below about 6.5.

Various methods may be used to prepare the alkali metal salts of riboflavin monoborate of the present invention. For example, a compound or compounds furnishing the alkali metal and $BO_2$ may be reacted directly with the riboflavin or the riboflavin monoborate may be first prepared, followed by reaction with an alkali metal compound.

In the preferred procedure, riboflavin is reacted in a suitable liquid medium with a water-soluble compound or compounds furnishing the alkali metal and $BO_2$. The reaction between the riboflavin and the compound or compounds furnishing the alkali metal and $BO_2$ is advantageously brought about at an elevated temperature (for example, a temperature of at least 65° C.). In many instances, a temperature of at least 80° C. is preferred and a desirable procedure when an aqueous medium is employed involves heating the medium containing the reactants to the boiling point, followed by further heating at a temperature of between about 80° C. and the boiling point for about one-half hour. The use of a temperature of at least 80° C. is recommended when the reactants are present in the medium in an amount to provide a concentration of the riboflavin compound of 10 milligrams per cc. or higher. In any particular case, the temperature, concentration, and time conditions employed will be sufficient to form the riboflavin compound. Excessive heating of the riboflavin-containing product is, however, undesirable and consequently the conditions of reaction are controlled so that an appreciable amount of the riboflavin nucleus will not be decomposed.

The compound or compounds furnishing the alkali metal and $BO_2$ may be a single compound containing both the alkali metal and the $BO_2$, for example, an alkali metal borate such as metaborates, tetraborates, or perborates. An alkali metal orthoborate may be used to supply the alkali metal and part of the $BO_2$, additional $BO_2$ being supplied by another boron compound so that the amount of alkali metal present is within the limits hereinafter set forth.

On the other hand, the alkali metal may be furnished by one compound and the $BO_2$ by another; thus the alkali metal may be supplied by a compound capable of reacting with a boric acid such as sodium, potassium, or lithium hydroxides or oxides, alkali metal alcoholates, alkali metal salts such as trisodium phosphate, and the like; while a compound providing a boric acid in solution such as orthoboric acid, metaboric acid, perboric acid, boric anhydride, boron oxide and the peroxide may serve as the $BO_2$-furnishing compound.

The amount of alkali metal- and $BO_2$-furnishing material employed will be sufficient to supply the stoichiometric amounts of alkali metal and $BO_2$ in the reaction. In other words, for each gram mol of riboflavin reacted, there should be approximately one gram atom of alkali metal and approximately one gram mol of $BO_2$ available for reaction therewith. When a compound such as borax is used, there will be supplied to the liquid medium an excess of the $BO_2$ over the amount required for the reaction but this excess does not interfere with the formation of the desired riboflavin monoborate salt, and in the isolation of the riboflavin compound the excess is easily removed from the compound. A moderate excess of the compound furnishing the $BO_2$ may, therefore, be used if desired, but the use of a large excess is to be avoided since it may lead to undesirable side reactions, contaminate the resulting solution, and lower the yield of the desired product. It is generally not desirable to employ the compound furnishing the alkali metal in an amount appreciably in excess of that theoretically required to form the riboflavin monoborate salt. It is to be understood that an excess of riboflavin may be present although this is not recommended, but excess riboflavin may be removed as unreacted, insoluble material from the solution of the riboflavin monoborate salt. The medium in which the reaction is conducted will have a pH greater than about 6.5 and preferably a pH greater than about 7.5.

As stated, the riboflavin is reacted in a liquid medium with the alkali metal- and $BO_2$-furnishing material to form the desired alkali metal salt of riboflavin monoborate which is present in the resulting solution. The liquid medium is one in which the alkali metal- and $BO_2$-furnishing material or materials, are soluble and in which the resulting riboflavin compound will be soluble. While water is the preferred medium, those inert organic solvents which are miscible with water and contain at least sufficient water to permit the reaction to proceed, such as water-containing alcohol, acetone, dioxane, propylene glycol, trimethylene glycol, ethylene glycol, and the like, may be employed as the reaction medium.

In the embodiment in which riboflavin monoborate is first formed, followed by reaction with an alkali metal compound, the riboflavin monoborate ($C_{17}H_{21}O_8N_4B$) may be prepared by any desired procedure. Thus, the riboflavin may be heated in a liquid medium with a boric acid; for example, riboflavin and metaboric acid in a molecular ratio such as 1 to 2 may be heated in glacial acetic acid to bring about the desired reaction. The resulting riboflavin monoborate is isolated and is then mixed with a solution containing an equivalent amount of a sodium, lithium, or potassium compound of the type hereinabove mentioned, resulting in the formation of the desired alkali metal salt. The solvent is the same type as hereinabove mentioned and will contain sufficient water to permit the reaction to proceed. The liquid medium in which the reaction between the riboflavin monoborate and alkali metal compound is conducted, will have a pH of at least about 6.5 and will preferably have a pH of at least about 7.5 to insure that all the compound will exist as the alkali metal salt of riboflavin monoborate.

If aseptic technique has been followed in the preparation of the alkali metal salt of riboflavin monoborate and the reactants and liquid medium have been selected so that only physiologically acceptable compounds are present in the solution, the solution may after being brought to the desired strength by concentration or dilution (if necessary) be used in the required proportions for therapeutic purposes. When such a solution has a pH value above about 7.5, concentrations as high as 390 mg. per cc. of riboflavin may be obtained, followed if necessary and desirable, by dilution to the proper concentration for therapeutic use. Herein, where reference is made to the amount, content, or concentration of riboflavin, the figures given are for the amount of riboflavin present in the riboflavin compound. In the preparation of solutions for therapeutic purposes having a pH above about 7.5 without isolation of the alkali metal salt of riboflavin monoborate, it is desirable to prepare the salt in a solution containing the equivalent of at least about 10 mg. of riboflavin per cc. or a concentration of about 1% riboflavin, since this represents five times the adult minimum daily requirement per cc. of solution, a recognized therapeutic level. However, as indicated above, the amount of riboflavin in such solutions may be smaller or larger than this figure. In this case where the liquid medium has a pH value approaching neutrality, the concentration of the solution obtained when niacinamide is not present as a solubilizing agent will not exceed about 3 mg. of riboflavin per cc. As will hereinafter be discussed, however, if niacinamide is employed with such solutions, the concentration of the riboflavin therein may be raised to five times the adult minimum daily requirement or higher. When the alkali metal salt of riboflavin monoborate is to be isolated from the solution, the riboflavin monoborate salt present in the solution may be any desired amount, but preferably the amount present will not exceed the solubility of the compound in the liquid medium at room temperature.

As stated, it is often desirable to obtain the alkali metal salt of riboflavin monoborate in solid form. If desired, the solution containing the salt of the monoborate prepared by either procedure described above (if it does not contain objectionable contaminants) may be dried by any of the known procedures—for example, by drying from the frozen state. Such a solution may also be subjected to precipitation, washing, and drying steps to obtain the compound in a solid, relatively pure form. For example, a solution containing the alkali metal salt of riboflavin monoborate may be poured into several volumes, i. e. five or more, of a water-miscible solvent in which the alkali metal salt of riboflavin monoborate is insoluble—such as, for example, acetone. The riboflavin compound precipitates from the resulting solution and any excess of the $BO_2$-supplying compound remains in solution in the acetone-water phase. The mixture is then filtered and washed with fresh solvent containing a small amount of water to remove any traces of excess $BO_2$-supplying compound. The residue may be further washed with fresh anhydrous solvent to remove water. If desired, this solid compound may be recrystallized following the standard chemical methods, using a solvent or combination of solvents in which the riboflavin compound dissolves upon heating and from which it separates on cooling. Examples of such solvents are methanol, or a combination of methanol, acetone, and a small amount of water. Traces of solvent are removed from the solid product by drying, such as, for example, in a vacuum desiccator over a suitable drying agent such as phosphoric anhydride or calcium chloride. During the above-described procedure, the liquid media employed will have a pH higher than about 6.5; preferably higher than about 7.5.

The material obtained as a solid from the solution comprises the novel riboflavin-containing compound which, as stated, has the empirical formula $C_{17}H_{20}O_8N_4BM$ where M is an alkali metal selected from the group consisting of sodium, potassium, and lithium. Aqueous solutions of the isolated alkali metal salt of riboflavin monoborate alone possess a pH of about 8.0. The compound is soluble in aqueous solutions having a pH above about 7.5 up to about 390 mg. of riboflavin per cc. (39%) and, therefore, can be used to prepare therapeutic solutions of desired concentrations. In most instances, the pH of the solution will not exceed about 9.0. In the absence of niacinamide aqueous solutions of a pH below about 7.5, such as within the neutral range, may be prepared containing riboflavin up to about 3 mg. per cc. or a concentration of about .3%. Aseptic technique should be followed in preparing solutions intended to be administered parenterally.

In addition to the alkali metal salt of riboflavin monoborate, the solid dry product may contain other vitamins such as niacinamide, vitamin C (ascorbic acid or sodium ascorbate), thiamine hydrochloride, vitamin $B_6$ (pyridoxine hydrochloride), calcium pantothenate, and the like. These other vitamin materials may also be present in a solution of the alkali metal salt of riboflavin monoborate, in which case the pH will be such that the vitamins will not deteriorate significantly before use or their conversion to the dried form. In addition, other compatible water-soluble therapeutic agents may be present in the dry composition or solution if desired.

As stated above, the riboflavin content in aqueous solution having a pH below about 7.5, that is within the neutral range and below, and in the absence of a solubilizing amide such as niacinamide, is limited to about 3 mg. per cc. of riboflavin. This not only means that in the absence of niacinamide, substantially neutral or acid therapeutic solutions of higher concentration are not available for administration but also that within a range from about 6.5 to about 7.5 only a limited amount of the riboflavin compound may be prepared in and isolated from such solutions. If it is desired to operate within this pH range and to increase the amount of riboflavin compound which may be isolated from the solution, the reaction between the riboflavin and the compound or compounds furnishing the alkali metal and the $BO_2$ may be carried out in the presence of niacinamide or other amide, such as benzamide or nikethamide at a temperature above about 65° C. In such case, the amide is added to the liquid medium containing the riboflavin and the other reactant or reactants and the alkali metal salt of riboflavin monoborate is thereafter formed as above set forth.

The solubility of the riboflavin salt in the liquid medium will increase, and hence the amount of the salt formed will increase, as the amount of the amide present is increased within limits, for example, if a solution containing 10 mg. per cc. of riboflavin is desired, the amide will generally be present in an amount equal to about five times (by weight) the amount of riboflavin present. Usually, it will not be desirable to employ an amount of amide greater than about ten times the amount of riboflavin present but more can be used if desired.

In isolating the riboflavin compound from the amide-containing solution, the solution is treated as above discussed, for example by pouring the solution into several volumes of the water-miscible solvent in which the compound is insoluble, such as acetone. The compound will precipitate and the amide will remain in solution in the liquid phase. When benzamide is employed as the amide, a substantial portion thereof will usually separate as crystals upon cooling of the solution from the temperature of reaction to room temperature and, if desired, these crystals may be separated from the solution by filtering or the like before the solution is poured into the water-miscible solvent.

While in the above discussion reference has been made to the separation of the alkali metal salt of riboflavin monoborate from the amide, it will be advantageous in many instances to prepare a product either in solid form or as a solution containing a therapeutically-active amide, particularly niacinamide, as well as the riboflavin monoborate salt. Thus the niacinamide may be present when the riboflavin monoborate salt is prepared as above set forth, and if aseptic conditions have been maintained, the resulting solution may be used therapeutically. It is, therefore, possible to prepare in this manner a solution having a pH value between about 6.5 and about 7.5 and containing several times the adult minimum daily requirements of both riboflavin and niacinamide. For example, if a solution within this pH range containing five times such requirements of both compounds per cc. is desired, the reaction may be carried out using 50 mg. per cc. of niacinamide and 10 mg. per cc. of riboflavin with the required amounts of the other reactant or reactants. It is also possible to prepare solutions of such concentrations and having a pH below about 6.5, and even very low pH values, for example, 0.05, by acidifying a solution prepared in the manner discussed above, with the addition of further amounts of niacinamide if necessary, as hereinafter discussed. To obtain a pH value below about 7.5, a therapeutically acceptable acidic material such as boric acid, acidic vitamin derivatives, or the like, may be employed. It will be clear that solutions of various concentrations may be obtained having pH values within or below the stated neutral range and that other vitamin materials may be added thereto in desired amounts.

In the preparation of a solid product containing both the riboflavin compound and the niacinamide, the solution containing the riboflavin compound, the niacinamide, and other vitamins, if desired, is treated to remove the aqueous phase, such as by drying from the frozen state or by vacuum drying at room temperature. The resulting dry, solid composition will be soluble in water to provide a solution containing at least 10 mg. of riboflavin per cc. at any desired pH value. The riboflavin compound in dry solid form exhibits good chemical stability; for example, when the sodium salt of riboflavin monoborate was dried from the frozen state from a solution having a pH between about 5 and about 7, the compound was found to have been chemically stable upon storage for several years.

The foregoing discussion has described the stabilization and solubilization of an alkali metal salt of riboflavin monoborate in solutions thereof having a pH between about 6.5 to about 7.5 by having the amide present in the solution at the time the riboflavin monoborate salt is formed. If a solution having a pH below about 7.5 and even below about 6.5 and a concentration in excess of the normal solubility of the riboflavin compound in water at those pH values is desired, such a solution may also be prepared by dissolving the desired amount of isolated riboflavin monoborate salt and the required amount of niacinamide in an aqueous solution, and adjusting the pH where necessary. For example, by this procedure, solutions containing five times or more the adult minimum daily requirements of riboflavin and niacinamide together with other vitamins, if desired, may be readily obtained. If a solution prepared in the above manner is dried, for example by drying from a frozen state or by drying under vacuum at room temperature, a solid product containing riboflavin is obtained which can be administered in that form or which may be redissolved in water to provide solutions of desired concentrations.

As stated previously, the alkali metal salts of riboflavin monoborate of the present invention are exceedingly soluble in alkaline aqueous solutions and, therefore, while niacinamide may be present in such solutions to impart additional therapeutic values thereto, the solubilizing effect of niacinamide in such solutions is not significant. As also pointed out, the solubility of the riboflavin compound is markedly less in aqueous solutions having a pH below about 7.5, and desired concentrations may be obtained by including niacinamide in such solutions. The reason for the solubilizing effect of niacinamide on the riboflavin compound in solutions having a pH below about 7.5 is not understood and, as indicated above, the form of the riboflavin monoborate salt in solutions having a pH value below about 6.5 has not been definitely determined but, regardless of the physical or chemical phenomena involved, it has been established that the niacinamide acts upon the riboflavin compound to produce relatively concentrated and stable solutions of available riboflavin having a pH value below about 7.5. In such solutions, while the composition of the riboflavin compound cannot be definitely described, it—as well as the product in alkaline aqueous solution—is the product of the dissolution of the salt in the specific aqueous medium and is so referred to in the claims.

The amount of niacinamide employed with solutions of a pH value below about 7.5 to solubilize the riboflavin compound will depend on the concentration of riboflavin desired, and the amount required to obtain a given concentration will in turn depend on the pH value. For example, to obtain a riboflavin concentration of 10 mg. per cc. or 1% concentration (five times the adult minimum daily requirement) by dissolving sodium riboflavin monoborate in solutions of the pH figures hereinafter set forth, the minimum amounts of niacinamide required are:

| pH Range | Percent Niacinamide |
| --- | --- |
| 0.05–2.5 | 20. |
| 2.5–6.0 | 12. |
| 6.0–7.0 | 5. |
| 7.0–7.6 | 5 or less. |

To obtain more concentrated solutions of the riboflavin compound in solutions having these pH values, greater amounts of niacinamide are required. For example, to obtain a concentration of 40 mg. of riboflavin per cc. (4%) at a pH range of between about 3.5 and about 4.5, a 40% concentration of niacinamide is required.

No precipitation will be observed in the above solutions upon storage for about a month and, if a solution is desired which will not exhibit precipitation for longer periods, the amount of niacinamide present should be increased.

The following examples illustrate methods of preparing the novel compounds of the present invention, and solutions comprising the same:

Example I

Riboflavin _____ 100 mg.
Borax _____ 50 mg.
Water _____ Quantity sufficient to make 10 cc. of solution.

The mixture is heated at 90°–100° C. until the reactants are dissolved, kept at this temperature for one-half hour, and then cooled. The pH of the solution is in the neighborhood of 8. If sterile technique has been followed, the solution of sodium salt of riboflavin monoborate may be injected. The compound may be isolated by pouring the solution into 6 volumes of acetone. The precipitated riboflavin compound is filtered and washed with acetone containing a little water. The residue is then washed with fresh anhydrous acetone to remove the water. Traces of solvent and moisture are removed by drying in a vacuum desiccator over $CaCl_2$.

Example II

Riboflavin _____g__ 3.0
Potassium hydroxide _____g__ 0.45
Boric acid _____g__ 0.50
Water _____cc__ 100.0

This mixture is heated to 95°–100° C. for about 30 minutes until the riboflavin has dissolved. The resulting solution is a solution of the potassium salt of riboflavin monoborate and has a pH of about 8. The solution may be utilized or the salt may be isolated as in Example I.

Example III

The same procedure is followed as in Example II using, however, an equivalent quantity of lithium hydroxide. The product is the lithium salt of riboflavin monoborate.

Example IV

A mixture is prepared from riboflavin, borax, boric acid, niacinamide, and water in a ratio to provide 20 mg. of riboflavin, 10 mg. of borax, 20 mg. of boric acid, 100 mg. of niacinamide, in each 2 cc. of solution. The resulting mixture is heated to 90° C.–100° C. until the reactants become dissolved and the solution is kept within this temperature range for one-half hour and then cooled. Other vitamins may be added, for example pyridoxine hydrochloride and calcium pantothenate, each in an amount equivalent to 10 mg. on the above basis, or sodium ascorbate in an amount equivalent on the above basis to 300 mg. of ascorbic acid. This solution will have a pH within the range of about 6.5 to about 7.5. The solution thus prepared may be administered as such or the aqueous phase may be removed therefrom to provide a solid product. Advantageously, a measured amount of the solution, for example 2 cc., is placed in a vial and dried from the frozen state. The dry product is soluble in 0.1 cc. of water (100 times the adult minimum daily requirement per cc.) and may, therefore, be dissolved by the physician before administration in desired concentrations with assurance that even with the concentrated solutions, there will be no tendency for precipitation of any of the components. For example, the physician may dissolve the dry product in 1, 2, 5, or 10 cc. of water depending upon the particular use for which it is intended.

Example V

A mixture is prepared from riboflavin, borax, boric acid, niacinamide, and water in a ratio to provide 20 mg. of riboflavin, 10 mg. of borax, 20 mg. of boric acid, and 200 mg. of niacinamide in each 2 cc. of water. The resulting mixture is heated to 90° C. to 100° C. until the reactants become dissolved and the solution is kept within this temperature range for one-half hour, then cooled. To this solution is added, 10 mg. of thiamine hydrochloride, 10 mg. of pyridoxine hydrochloride, and 10 mg. of calcium pantothenate. This solution will have a pH somewhat below 6.5. If desired, other therapeutically acceptable acidic substances may be added. The solution thus prepared may be administered as such or the aqueous phase may be removed therefrom to provide a solid product. Advantageously, a measured amount of the solution, for example 2 cc. is placed in a vial and dried from the frozen state. The dry product is soluble in 0.1 cc. of water, and may be administered in any desirable concentration, for example as in Example IV.

In preparing any of the compositions described herein, it may be desirable to increase each of the active components by about 10%, in accordance with standard pharmaceutical practice, to compensate for possible deterioration.

Any of the alkali metal salts of riboflavin monoborate prepared as illustrated by the foregoing examples may be made up into therapeutic solutions in accordance with the procedures set forth in this specification. Moreover, as stated, any of these salts or combinations thereof, may be compounded dry with other dry ingredients to form valuable therapeutic compositions which may be administered in solid form, for example, orally or by implantation, or in the form of aqueous solutions of desired concentrations, for example, orally, parenterally or by other routes of administration.

Considerable modification is possible in the methods employed in the preparation of the alkali metal salt of riboflavin monoborate described herein, as well as in the utilization of the novel riboflavin compound in therapeutic preparations, without departing from the essential features of the invention.

I claim:

1. As a product having therapeutic value, an alkali metal salt of riboflavin monoborate having the empirical formula $C_{17}H_{20}O_8N_4BM$, wherein M is an alkali metal selected from the group consisting of sodium, potassium, and lithium.

2. As a product having therapeutic value, the sodium salt of riboflavin monoborate having the empirical formula $C_{17}H_{20}O_8N_4BNa$.

3. The process of preparing a stable water-soluble riboflavin compound which comprises reacting in a water-containing liquid medium and at a temperature above about 65° C., riboflavin, and a water-soluble boric acid radical-supplying compound and a water-soluble alkali metal-supplying compound reactive therewith in substantially stoichiometric quantities to provide the alkali metal salt of riboflavin monoborate having the empirical formula $C_{17}H_{20}O_8N_4BM$, wherein M is an alkali metal selected from the group consisting of sodium, potassium, and lithium.

4. The process of claim 3 wherein the liquid medium is water, wherein M is sodium, and wherein the reaction temperature is between about 80° C. and the boiling point of the solution.

5. A solution having therapeutic value comprising, in an aqueous solution having a pH between about 7.5 and about 9, the product of the dissolution therein of an alkali metal salt of riboflavin monoborate having the empirical formula $C_{17}H_{20}O_8N_4BM$, wherein M is an alkali metal selected from the group consisting of sodium, potassium, and lithium.

6. A solution having therapeutic value comprising, in an aqueous solution having a pH between about 6.5, and about 9, the product of the dissolution therein of an alkali metal salt of riboflavin monoborate having the empirical formula $C_{17}H_{20}O_8N_4BM$, where M is an alkali metal selected from the group consisting of sodium, potassium, and lithium.

7. A solution having therapeutic value comprising, in an aqueous solution having a pH between about 6.5 and about 9, the product of the dissolution therein of the sodium salt of riboflavin monoborate having the empirical formula $C_{17}H_{20}O_8N_4BNa$.

8. A solution having therapeutic value comprising, in an aqueous solution having a pH below about 7.5, the product of the dissolution therein of an alkali metal salt of riboflavin monoborate having the empirical formula $C_{17}H_{20}O_8N_4BM$, wherein M is an alkali metal selected from the group consisting of sodium, potassium, and lithium, and niacinamide, the concentration of riboflavin in said solution being greater than 0.012%.

9. A solution having therapeutic value comprising, in an aqueous solution having a pH below about 7.5, the product of the dissolution therein of an alkali metal salt of riboflavin monoborate having the empirical formula $C_{17}H_{20}O_8N_4BNa$, and niacinamide in an amount of at least about five times the weight of the riboflavin, the concentration of riboflavin in said solution being greater than 0.012%.

10. The product of claim 9, wherein the pH is between about 6.5 and about 7.5.

11. A dry composition soluble in water to provide a pH value of between about 6.5 and about 7.5 and a solution containing the equivalent of at least 10 mg. per cc. of riboflavin comprising an alkali metal salt of riboflavin monoborate having the empirical formula $C_{17}H_{20}O_8N_4BM$, wherein M is an alkali metal selected from the group consisting of sodium, lithium, and potassium, niacinamide in an amount of at least about five times the weight of the riboflavin, and a therapeutically acceptable, water-soluble acidic material to provide the said pH value.

12. The composition of claim 11, wherein M is sodium.

13. The process of producing a water-soluble riboflavin, which comprises mixing 2 parts of riboflavin, 2 parts of boric acid, 1 part of sodium borate and 10 parts of niacinamide, dissolving the mixture in distilled water brought to the boiling point and then permitting the solution to cool, adding the solution under stirring to acetone, permitting the water-soluble riboflavin to precipitate out, washing and drying the same.

14. The process of producing a water-soluble riboflavin which comprises dissolving approximately two parts of riboflavin, approximately two parts of boric acid, approximately one part of sodium borate, and approximately ten parts of an amide selected from the group consisting of niacinamide, nikethamide and benzamide in water at a temperature above about 65° C.; and then permitting the solution to cool.

15. The process of claim 14 wherein the amide is niacinamide.

16. The process of producing a water-soluble riboflavin which comprises dissolving approximately two parts of riboflavin, approximately two parts of boric acid, approximately one part of sodium borate, and approximately ten parts of an amide selected from the group consisting of niacinamide, nikethamide and benzamide in water at a temperature above about 65° C.; permitting the solution to cool; mixing the solution with acetone; permitting the water-soluble riboflavin to precipitate out; and filtering said water-soluble riboflavin from the solution.

17. The process of claim 16 wherein the amide is niacinamide.

RICHARD DE MOTT FINE III.

References Cited in the file of this patent

UNITED STATES PATENTS

| Number | Name | Date |
|---|---|---|
| 2,256,604 | Auhagen | Sept. 23, 1941 |
| 2,332,548 | Auerbach | Oct. 26, 1943 |
| 2,388,261 | Frost | Nov. 6, 1945 |
| 2,407,412 | Frost | Sept. 10, 1946 |

OTHER REFERENCES

Frost, Journal of Biological Chemistry, vol. 145, October 1942, pages 693 to 700.